April 11, 1950  R. S. TICE  2,503,601

ELECTRIC FLOOR HEATING SYSTEM

Filed March 5, 1949

INVENTOR.
REUBEN S. TICE
BY
Bryken, Mohler & Beckley
ATTORNEYS

Patented Apr. 11, 1950

2,503,601

UNITED STATES PATENT OFFICE 2,503,601

ELECTRIC FLOOR HEATING SYSTEM

Reuben S. Tice, Monterey, Calif.

Application March 5, 1949, Serial No. 79,829

7 Claims. (Cl. 219—19)

This invention relates to a heating system, and particularly, to floors of rooms where such floors are of wooden construction.

The present invention is similar in certain respects to the invention disclosed in my co-pending application for United States Letters Patent, Serial No. 724,824 in that it employs an iron cable and operates in generally the same manner in so far as the preferred electrical characteristics are concerned.

One of the objects of the present invention is the provision of a noiseless, safe and efficient heating system that is particularly suited for buildings with wooden floors.

The use of high voltages and electrical heating elements that become quite hot when in use have not been accepted generally for reasons of safety and economy, as well as for other reasons. In relatively low voltage and high amperage systems as heretofore employed, under certain circumstances there has been an objectionable hum and rather rapid dissipation of heat when the current is off.

The present invention overcomes the above objections.

Figure 1:
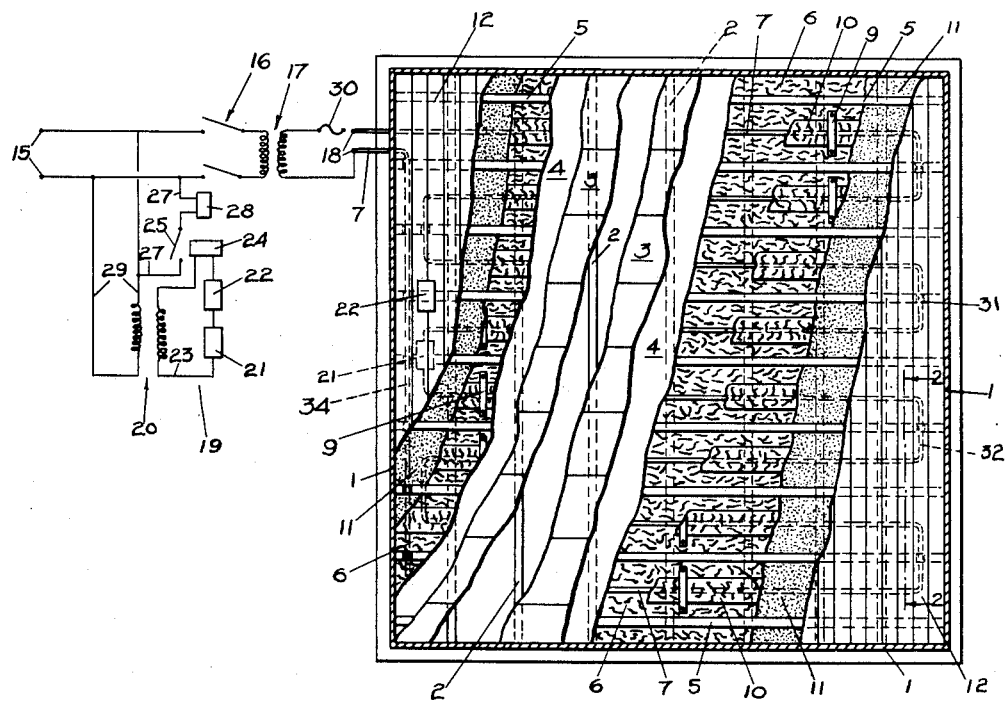
Fig. 1 is a semi-diagrammatic plan view of a floor in a room in which the heating system is installed, and which view includes the electrical control system between the room heating means and the main source of electrical power.

The walls of the room are indicated at 1 in Fig. 1, it being understood that the windows and doors are omitted inasmuch as these have nothing to do with the invention. Also, it is to be understood that the word "room" or "rooms" is intended to include halls and any floored portion within a building.

In the present invention the floor preferably comprises floor joists 2 on which are supported a subfloor 3 of any suitable type of lumber. This subfloor may be covered with building paper 4, and over the building paper are horizontal, spaced sleepers or beams 5. Any desired heat insulation material, such as pressed cane or wood fibers adequate to support the sleepers may be used instead of building paper.

The spacing between the sleepers in conventional building structure is usually about one foot apart.

Between each adjacent pair of sleepers and on the building paper, is a layer 6 of heat insulation material, such as fiberglass, which is also electrical insulation material. Supported on the insulation material 6 is the electrical conductor 7 that is in the form of an uninsulated wire rope or cable.

Preferably, this type of cable is referred to in the trade as ½ inch 6 x 37 rope or cable, and is of relatively soft iron, galvanized. The cross-sectional area, due to voids between the wires, is essentially ⅝ of an inch, but the circular mil area is approximately that of ½ inch solid rod, or 250,000 c. m. This cable is specially processed to insure uniformity in electrical resistance, which is important, otherwise the resistance could vary as much as 25 per cent.

The cable is laid in a grid form, being continuous with parallel, elongated runs connected by return bends and spaced about a foot apart.

Figure 2:
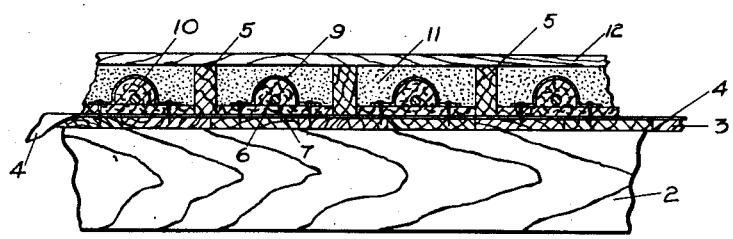
Fig. 2 is an enlarged sectional view taken along line 2—2 of Fig. 1.

In the preferred structure, the cable is secured against the fiberglass or other similar insulation 6 by pipe straps 9, and fiberglass 10 (Fig. 2) is between the straps 9 and the cable to insulate or deaden the vibration of the cable and to hold the cable in place.

Between the adjacent sleepers 5 and over the cable and insulation 6 is dry sand 11. This sand preferably fills the space between the subfloor and the top floor 12 that is secured to the sleepers 5.

By the above system not only is the hum or objectionable noise eliminated, but the sand functions as a heat conductor and retainer, which will slowly give off its heat for a relatively long period of time after the current is off. Also, the sand is an electrical insulation.

The resistance of the cable or conductor is preferably such that one volt impressed on ten lineal feet of cable will cause a current of substantially 130 amps. of flow. The wattage per square foot may be varied; for example, near windows it can be made higher to compensate for the greater loss at these points. Normal density is, however, about 10 to 15 watts per square foot. This works out to about one lineal foot of cable per square foot of floor area to give the desired wattage densities. The wattage per square foot may be varied by spacing the runs of cable, say from 6 to 14 inches apart.

In actual practice, the cable temperature may have a maximum temperature as high as 150° F., but normally it operates at about 110° to 120° F., which is safe, and the actual floor temperatures will usually be about 73° to 85° F.

In its preferred form, characteristics of the present system are the use of a large conductor and high current density at low voltage. Absolute freedom from mechanical troubles is insured by the size of the cable.

The voltage range may be from about 20 to about 70 volts, depending upon the length of cable in a circuit. In certain instances several transformers and circuits may be used in a single home, while in others one circuit may be used.

A preferred circuit is illustrated in which the voltage is between about 30 and 35 volts. Assuming it requires an expenditure of 3900 watts electrical energy to heat a given room volume, and that 30 volts is to be applied to the cable, it is necessary to know the length of the cable required. If I equals current in amperes, W equals power in watts, and E equals voltage in volts, the current required is found by the formula:

$$I = \frac{W}{E} = \frac{3900}{30} = 130 \text{ amperes}$$

The total resistance R in ohms of the conductor may be found by the formula:

$$R = \frac{E}{V} = \frac{30}{130} = .232 \text{ ohm}$$

Since it is known that the special ½ inch cable here employed has a resistance R of approximately .00077 ohm per foot, the length can be found by the following formula, where L equals the total length in feet:

$$L = \frac{R}{V} = \frac{.232}{.00077} = 300 \text{ feet}$$

By the above it is apparent that the application of 130 amperes at 30 volts to 300 feet of the special ½ inch 6 x 37 galvanized cable of the type described will supply heating of approximately 3900 watts. The current and the length of the conductor are inversely proportional to one another and either may be reduced by increasing the other. Thus, the above example is for illustrative purposes only, and other values may be adapted to suit particular needs.

In the circuit illustrated, line voltage is supplied at terminals 15, which in the usual case is 220 volts, 60 cycles. Double pole relay switch 16 is for applying the line voltage to the primary of a transformer 17, the secondary of which transformer is connected to the terminals 18 of the cable 7 when the switch 16 is closed current at about 30 to 34 volts, or as reduced by transformer 17, is supplied to the cable.

The transformer 17 acts as an isolating transformer so that stray currents cannot be generated that would be detrimental to the power system servicing the particular place to be heated, nor could there be any danger to the occupants of said place due to stray currents that might be generated in the absence of the transformer.

The line voltage is also applied to the primary of a transformer 20. The secondary coil of transformer 20 is in a low voltage control circuit 19, such as a 24 volt circuit. In series with the secondary winding of transformer 20 are two conventional thermostats. One is a thermostat 21, preferably of the bimetal type, and a room thermostat 22 that is on the wall of the room to be heated and this thermostat is preferably of the type that is sensitive to 0.1° F. Both thermostats are in series with the secondary winding of transformer 20 in a closed circuit 23, and the coil of a relay switch 24 is also in series in circuit 23.

The temperature sensitive element of the cable thermostat 21 is connected directly to the cable or conductor 7 and the temperature sensitive element of the room thermostat 22 is positioned within the most desirable spot in the room to be heated.

Should the temperature in the room or the temperature of the cable rise above a predetermined degree, the control circuit is broken by the temperature actuated switch of either thermostat resulting in cessation of current to the coil of relay 24. Cessation of current to said coil will release the relay switch element 25 in a line 27 that is connected with the line voltage at all times. A relay coil 28 is in series in line 27 and this, in turn, closes switch 16 when the switch 25 is closed, but a breaking of the current in line 27 will release switch 16 which discontinues current to the primary winding of transformer 17 with the result that current in the cable is discontinued until current is reestablished by the thermostat 22, or by thermostat 21, or both. The primary winding of the transformer 20 is always in the line voltage in a circuit 29.

A conventional fuse 30 of fusible metal may be positioned in the cable circuit as an added precaution if desired, but it is not essential to the performance of the system.

By the above arrangement where the voltage in the power supply line is constant, it is obvious that the heating system is safe in so far as the voltage in the cable circuit is concerned. The low voltage in the control system also makes it safe. When the room temperature reaches a predetermined temperature the cable circuit is broken. The cable circuit will also be broken if the cable temperature should rise to a predetermined degree. Both thermostatically actuated switches must be closed before the cable circuit is closed, thus double protection is provided in the control circuit in addition to the fuse in the cable circuit.

The provision of the cable circuit within enclosed sand-filled passageways between the main floor and a subfloor, including the structure insulating the cable from the subfloor both at the points of the pipe straps 9 and between the cable and subfloor is quite important toward accomplishing the desired result. The sleepers may be recessed at points 31 at the return bends 32 of the latter to facilitate laying the cable, and similar recesses at 33 (Fig. 1) are provided for the final run 34 of said cable back to the starting point of the cables.

I claim:

1. In a floor, a length of cable arranged intermediate its ends to provide a grid of spaced parallel sections of said cable with adjacent pairs thereof connected by return bends, an alternating current, relatively high voltage source of electrical power, a primary and a secondary winding of a step-down transformer respectively in said source and connecting said ends of said cable for inducing a relatively low voltage current in said cable, said cable being of ferrous metal of about one-half inch in diameter and the voltage and current characteristics of the electrical circuit provided by said grid and the arrangement of the latter being such as to produce substantially about 10 to about 15 watts per square foot of floor area, and discrete particles of sound and electrical insulation material in immediate contact with said cable covering the same.

2. In a floor, a length of cable arranged intermediate its ends to provide a grid of spaced parallel sections of said cable with adjacent pairs thereof connected by return bends, an alternating current, relatively high voltage source of electrical power, a primary and a secondary winding of a step-down transformer respectively in said source and connecting said ends of said cable for inducing a relatively low voltage current in said cable, said cable being of ferrous metal of about one-half inch in diameter and said parallel sections being spaced apart about one foot, the resistance of said grid being such that a current of substantially 130 amperes will be caused to flow through each ten lineal feet of cable for each volt impressed upon the latter, a strip of fibrous heat and sound insulation material on which said cable is supported, and discrete particles of sound and electrical insulation material covering said cable and in intimate contact therewith.

3. A floor heating system comprising a main floor and a subfloor spaced therebelow, parallel spaced partitions between said main floor and said subfloor dividing the space between them into a plurality of parallel passageways, an electrical conductor cable of ferrous metal of relatively large diameter extending back and forth through said passageways with a single section of the length of said cable in each of said passageways, said passageways having dry sand therein filling the space between each of said sections and said main floor.

4. A floor heating system comprising a main floor and a subfloor spaced therebelow, parallel spaced partitions between said main floor and said subfloor dividing the space between them into a plurality of parallel passageways, an electrical conductor cable of ferrous metal of relatively large diameter extending back and forth through said passageways with a single section of the length of said cable in each of said passageways, said passageways having dry sand therein filling the space between each of said sections and said main floor, a sheet of electrical and heat insulation material supporting each of said sections on said subfloor and fastening means for securing said cable to said subfloor including a strip of electrical and vibration insulation material extending around said cables.

5. A floor heating system comprising a main floor and a subfloor spaced therebelow, parallel spaced partitions between said main floor and said subfloor dividing the space between them into a plurality of parallel passageways, an electrical conductor cable of ferrous metal of relatively large diameter extending back and forth through said passageways with a single section of the length of said cable in each of said passageways, said passageways having dry sand therein filling the space between each of said sections and said main floor, a sheet of electrical and heat insulation material supporting each of said sections on said subfloor and fastening means for securing said cable to said subfloor including a strip of electrical and heat insulation material extending around said cables, said sheet being fiberglass, and said cable being uninsulated and of about one-half inch in diameter, means for supplying electrical power of relatively low voltage and high amperage to said cable.

6. A floor heating system comprising a main floor and a subfloor spaced therebelow, a plurality of equally spaced parallel sleepers spacing said subfloor below said main floor and supporting the latter above said subfloor, an electrical conductor cable of relatively large diameter ferrous metal in the form of a grid extending back and forth through said passageways with a single section of the length of said cable in each passageway equally spaced between the adjacent pair of said sleepers between which each such section extends, a layer of heat insulation material on said subfloor between said sleepers supporting said cable thereon, and dry sand supported on said layer filling the remainder of said space between said main floor and said subfloor.

7. A floor heating system comprising a main floor and a subfloor spaced therebelow, a plurality of equally spaced parallel sleepers spacing said subfloor below said main floor and supporting the latter above said subfloor, an electrical conductor cable of relatively large diameter ferrous metal in the form of a grid extending back and forth through said passageways with a single section of the length of said cable in each passageway equally spaced between the adjacent pair of said sleepers between which each such section extends, a layer of heat insulation material on said subfloor between said sleepers supporting said cable thereon, and dry sand supported on said layer filling the remainder of said space between said main floor and said subfloor, pipe straps securing said cable to said subfloor and a strip of electrical and vibration insulation material between each of said straps and said cable.

REUBEN S. TICE.

REFERENCES CITED

The following references are of record in the file of this patent:

FOREIGN PATENTS

| Number | Country | Date |
|---|---|---|
| 309,093 | Great Britain | Apr. 5, 1929 |